US010467962B2

(12) United States Patent
Jeong

(10) Patent No.: US 10,467,962 B2
(45) **Date of Patent: *Nov. 5, 2019**

(54) PIXEL CIRCUIT AND METHOD OF DRIVING THE SAME

(71) Applicant: Samsung Display Co., Ltd., Yongin-Si, Gyeonggi-Do (KR)

(72) Inventor: Il-Hun Jeong, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,318

(22) Filed: Jan. 22, 2019

(65) Prior Publication Data

US 2019/0156743 A1 May 23, 2019

Related U.S. Application Data

(63) Continuation of application No. 15/461,808, filed on Mar. 17, 2017, now Pat. No. 10,204,553.

(30) Foreign Application Priority Data

Apr. 15, 2016 (KR) ........................ 10-2016-0045885

(51) Int. Cl.
*G06F 3/041* (2006.01)
*G09G 3/36* (2006.01)
(Continued)

(52) U.S. Cl.
CPC ......... *G09G 3/3233* (2013.01); *G09G 3/3266* (2013.01); *G09G 3/3291* (2013.01);
(Continued)

(58) Field of Classification Search
CPC .. G09G 3/3233; G09G 3/3266; G09G 3/3291; G09G 2300/0819;
(Continued)

(56) References Cited

U.S. PATENT DOCUMENTS

2014/0146028 A1 5/2014 Choi et al.
2014/0168194 A1 6/2014 Kong et al.
2015/0348463 A1* 12/2015 Lee ...................... G09G 3/3233 345/690

FOREIGN PATENT DOCUMENTS

KR 10-2011-0013692 A 2/2011

* cited by examiner

*Primary Examiner* — Nelson M Rosario
(74) *Attorney, Agent, or Firm* — Innovation Counsel LLP

(57) ABSTRACT

A pixel circuit comprises a light emission element; a driving transistor including a first electrode connected to the first node, a second electrode connected to a second node, and a gate electrode connected to a third node; a first transistor including a first electrode receiving a third voltage, a second electrode connected to the first node, and a gate electrode receiving a second light emission control signal; a first transistor including a first electrode connected to a first line transferring a first power voltage, a second electrode connected to the second node, and a gate electrode receiving a first light emission control signal; a first storage capacitor connected between the third node and a fourth node; and a switching transistor including a first electrode connected to a data line, a second electrode connected to the fourth node, and a gate electrode receiving a scan signal.

20 Claims, 14 Drawing Sheets

(51) Int. Cl.
*G09G 3/3233* (2016.01)
*G09G 3/3266* (2016.01)
*G09G 3/3291* (2016.01)

(52) U.S. Cl.
CPC ............... *G09G 2300/0819* (2013.01); *G09G 2300/0842* (2013.01); *G09G 2300/0852* (2013.01); *G09G 2300/0861* (2013.01); *G09G 2310/0243* (2013.01); *G09G 2310/08* (2013.01); *G09G 2320/0233* (2013.01); *G09G 2320/0238* (2013.01); *G09G 2330/028* (2013.01)

(58) Field of Classification Search
CPC ... G09G 2300/0842; G09G 2300/0852; G09G 2300/0861; G09G 2310/0243; G09G 2310/08; G09G 2320/0233; G09G 2320/0238; G09G 2330/028
See application file for complete search history.

PIXEL CIRCUIT AND METHOD OF DRIVING THE SAME

CROSS-REFERENCE TO RELATED APPLICATION(S)

This application is a continuation application of U.S. patent application Ser. No. 15/461,808 filed on Mar. 17, 2017, claims priority under 35 USC § 119 to Korean Patent Application No. 10-2016-0045885, filed on Apr. 15, 2016 in the Korean Intellectual Property Office (KIPO), the contents of which are incorporated herein in its entirety by reference.

BACKGROUND

1. Technical Field

Example embodiments relate to a display device. More particularly, embodiments of the present inventive concept relate to a pixel circuit included in a display device and a method of driving the display device.

2. Description of the Related Art

A pixel circuit may emit light based on a data voltage and includes a transistor for driving the pixel circuit (e.g., a thin film transistor; TFT). The transistor may be categorized into an amorphous silicon (a-si) transistor, a polycrystalline silicon (poly-si) transistor, an oxide transistor, and etc. according to used materials.

A Silicon transistor (e.g., a low temperature poly-silicon thin film transistor; LTPS TFT) has high electron mobility such that the silicon transistor enables implementation of a high-resolution of a display device. However, a mask process of the silicon transistor is complex and has a high manufacturing cost. The oxide transistor has high electron mobility and a low leakage current such that the oxide transistor enables a low power of the display device. In addition, the oxide transistor has a mask process which is simpler than a mask process of the silicon transistor and has a lower manufacturing cost. However, the oxide transistor is generally implemented as an N-type transistor (e.g., an NMOS transistor) based on oxygen vacancies and zinc-interstitials, and it is difficult to dope with P-type dopants in the oxide transistor.

Because the data signal provided to the pixel circuit is lowered by a capacitance of a light emission element, the pixel circuit may not emit a light with a target luminance corresponding to the data signal. New pixel circuits including an external compensation circuit to prevent a loss of the data signal have been proposed.

SUMMARY

Some example embodiments provide a pixel circuit which has an N-type transistor and prevents a loss of a data signal.

Some example embodiments provide a method of driving a pixel circuit.

According to example embodiments, a pixel circuit may include a light emission element electrically connected between a first node and a second power voltage; a driving transistor including a first electrode which is electrically connected to the first node, a second electrode which is electrically connected to a second node, and a gate electrode which is electrically connected to a third node; a first transistor including a first electrode which receives a third voltage, a second electrode which is electrically connected to the first node, and a gate electrode which receives a second light emission control signal; a second transistor including a first electrode which is electrically connected to a first line transferring a first power voltage, a second electrode which is electrically connected to the second node, and a gate electrode which receives a first light emission control signal; a third transistor including a first electrode which is electrically connected to the second node, a second electrode which is electrically connected to the third node, and a gate electrode which receives a compensation control signal; a first storage capacitor electrically connected between the third node and a fourth node; a second storage capacitor electrically connected between the fourth node and the first node; and a switching transistor including a first electrode which is electrically connected to a data line, a second electrode which is electrically connected to the fourth node, and a gate electrode which receives a scan signal.

In example embodiments, each of the driving transistor, the first transistor, the second transistor, the third transistor, and the switch transistor may be an N-channel metal oxide semiconductor (NMOS) transistor, where the first power voltage has a voltage level lower than a voltage level of the second power voltage.

In example embodiments, the second transistor may be turned on in a first period and in a fourth period and may be turned off in a second period and in a third period in response to the first light emission control signal. Here, the first period may be to initialize a third node voltage at the third node, the second period may be to compensate a threshold voltage of the driving transistor, the third period may be to receive a data signal, the fourth period may be for the light emission element to emit a light, and the first through fourth periods may be included in an operation period and may be different from each other.

In example embodiments, the first transistor may be turned on in the first period, in the second period, and in the third period and may be turned off in the fourth period in response to the second light emission control signal.

In example embodiments, the third transistor may be turned on in the first period, in the second period, and in the third period and is turned off in the fourth period in response to the second light emission control signal.

In example embodiments, the switching transistor may be turned on in the first period, in the second period and in the third period in response to the scan signal and may transfer the third voltage to fourth node.

In example embodiments, the first storage capacitor may store the threshold voltage of the driving transistor in the second period.

In example embodiments, the switching transistor may be turned on in the third period in response to the scan signal and transfers the data voltage to fourth node.

In example embodiments, the second capacitor may store the data voltage in the third period.

In example embodiments, the third voltage may be equal to or lower than a threshold voltage of the light emission element.

According to example embodiments, a pixel circuit may include a light emission element electrically connected between a first node and a second power voltage; a driving transistor including a first electrode which is electrically connected to the first node, a second electrode which is electrically connected to a first line transferring a first power voltage, and a gate electrode which is electrically connected to a third node; a first transistor including a first electrode which receives a third voltage, a second electrode which is electrically connected to the first node, and a gate electrode which receives a second light emission control signal; a third transistor including a first electrode which receives a reference voltage, a second electrode which is electrically connected to the third node, and a gate electrode which receives a compensation control signal; a storage capacitor electrically connected between the third node and a fourth node; a fifth transistor including a first electrode which is electrically connected to the first node, a second electrode which is electrically connected to the fourth node, and a gate electrode which receives a first light emission control signal; and a switching transistor including a first electrode which is electrically connected to a data line, a second electrode which is electrically connected to the fourth node, and a gate electrode which receives a scan signal.

In example embodiments, the pixel circuit may further include a second transistor including a first electrode which is electrically connected to the first line, a second electrode which is electrically connected to the second electrode of the driving transistor, and a gate electrode which receives the first light emission control signal. Here, the first electrode of the third transistor may be electrically connected to the second node, and the second node may be electrically connected to the second electrode of the driving transistor and the second electrode of the second transistor.

In example embodiments, the second transistor may be turned on in a first period and in a fourth period and may be turned off in a second period and in a third period in response to the first light emission control signal. Here, the first period may be to initialize a third node voltage at the third node, the second period may be to compensate a threshold voltage of the driving transistor, the third period may be to receive a data signal, the fourth period may be for the light emission element to emit a light, and the first through fourth periods may be included in an operation period and may be different from each other.

In example embodiments, the first transistor may be turned on in the first period, in the second period, and in the third period and may be turned off in the fourth period in response to the second light emission control signal.

In example embodiments, the third transistor may be turned on turned on in the first period and in the second period and is turned off in the third period and in the fourth period in response to the compensation control signal.

In example embodiments, the switching transistor may be turned on in the second period and in response to the scan signal and may transfer the third voltage to fourth node.

In example embodiments, the storage capacitor may store the threshold voltage of the driving transistor in the second period.

In example embodiments, the switching transistor may be turned on turned on in the first period and in the second period in response to the scan signal and charge the storage capacitor.

In example embodiments, the reference voltage may be equal to the third voltage, and the second light emission control signal may have has a turn-on level voltage during the first period, the second period and the third period.

In example embodiments, the third transistor may be turned on in the first period and the second period and is turned off in a third period and in a fourth period in response to the compensation control signal. Here, the first period may be to initialize a third node voltage at the third node and the second period may be to compensate a threshold voltage of the driving transistor, the third period may be to receive a data signal, the fourth period may be for the light emission element to emit a light, and the first through fifth periods may be included in an operation period and may be different from each other.

In example embodiments, the fifth transistor may be turned on in the first period and in the fourth period and is turned off in the second period and in the third period in response to the first light emission control signal.

In example embodiments, the storage capacitor may store the threshold voltage of the driving transistor in the second period.

In example embodiments, the first transistor may be turned on in the third period in response to the scan signal and may transfer the third voltage to the first node, and the switching transistor may be turned on in the third period in response to the scan signal and may transfer the data voltage to the fourth node.

In example embodiments, the pixel circuit may further include a sixth transistor including a first electrode which is electrically connected to the first node, a second electrode which is electrically connected to the fourth node, and a gate electrode which receives the initialization signal.

In example embodiments, each of the third transistor and the sixth transistor may be turned on in a first period and the second period and may be turned off in a third period and in a fourth period based on the compensation control signal. Here, the fifth period may be to initialize a third node voltage at the third node and may be to compensate a threshold voltage of the driving transistor, the third period may be to receive a data signal, the fourth period may be for the light emission element to emit a light, and t the first through fourth periods may be included in an operation period and may be different from each other.

In example embodiments, the fifth transistor may be turned on in the fourth period and may be turned off in the first through the third periods in response to the first light emission control signal.

In example embodiments, the first transistor may be turned on in the third period in response to the scan signal and may transfer the third voltage to the first node, and the switching transistor may be turned on in the third period in response to the scan signal and may transfer the data voltage to the fourth node.

According to example embodiments, a method of driving a pixel circuit may drive the pixel circuit which includes a light emission element, a driving transistor, and first and second storage capacitors, which are electrically connected in serial between a first electrode of the driving transistor and a gate electrode of the driving transistor. The method may include initializing a third node voltage applied to the gate electrode of the driving transistor by electrically connecting a second electrode of the driving transistor and the gate electrode of the driving transistor when the second electrode of the driving transistor is electrically connected to a first line transferring a first voltage; maintaining a first node voltage at a first node with a third voltage by applying a third voltage to the first node, the first node being electrically connected to the light emission element and the first electrode of the driving transistor; compensating a threshold voltage of the driving transistor by disconnecting the first line and the second electrode of the driving transistor when the third voltage is provided to a fourth node at which the first storage capacitor is electrically connected to the second storage capacitor; applying the data voltage to the fourth node; stopping a supply of the third voltage to the first node; and transferring the light emission element with a driving current corresponding to the third node voltage by electrically connecting the first line to the second electrode of the driving transistor.

According to example embodiments, a method of driving a pixel circuit may drive the pixel circuit which includes a light emission element, a driving transistor, and a storage capacitor electrically connected between a first electrode of the driving transistor and a gate electrode of the driving transistor. The method may include initializing a third node voltage applied to the gate electrode of the driving transistor by supplying an initialization signal to the third node when the second electrode of the driving transistor is electrically connected to a first line transferring a first voltage; maintaining a first node voltage at a first node with a third voltage by applying a third voltage to the first node, the first node being electrically connected to the light emission element and the first electrode of the driving transistor; applying the data voltage to the terminal of the storage capacitor; stopping a supply of the third voltage to the first node; and transferring the light emission element with a driving current corresponding to the third node voltage.

According to example embodiments, a pixel circuit may include a light emission element electrically connected between a first node and a second power voltage, a driving transistor including a first electrode which is electrically connected to the first node, a second electrode which is electrically connected to a second node, and a gate electrode which is electrically connected to a third node, a first transistor including a first electrode which is electrically connected to a first line transferring a first power voltage, a second electrode which is electrically connected to the second node, and a gate electrode which receives a first light emission control signal, a first storage capacitor electrically connected between the third node and a fourth node, and a switching transistor including a first electrode which is electrically connected to a data line, a second electrode which is electrically connected to the fourth node, and a gate electrode which receives a scan signal.

In example embodiments, the pixel circuit may further include a second transistor including a first electrode which receives a third voltage, a second electrode which is electrically connected to the first node, and a gate electrode which receives a second light emission control signal.

In example embodiments, the pixel circuit may further include a third transistor including a first electrode which is electrically connected to the second node, a second electrode which is electrically connected to the third node, and a gate electrode which receives a compensation control signal.

In example embodiments, the pixel circuit may further include a second storage capacitor electrically connected between the first node and a fourth node.

In example embodiments, the pixel circuit may further include a fourth transistor electrically connected between the first node and a fourth node.

According to example embodiments, a pixel circuit may include a light emission element electrically connected between a first node and a second power voltage, a driving transistor including a first electrode which is electrically connected to the first node, a second electrode which is directly connected to a first line transferring a first power voltage, and a gate electrode which is electrically connected to a third node, a storage capacitor electrically connected between the third node and a fourth node, and a switching transistor including a first electrode which is electrically connected to a data line, a second electrode which is electrically connected to the fourth node, and a gate electrode which receives a scan signal.

In example embodiments, the pixel circuit may further include a first transistor including a first electrode which receives a third voltage, a second electrode which is electrically connected to the first node, and a gate electrode which receives a second light emission control signal.

In example embodiments, the pixel circuit may further include a second transistor including a first electrode which receives the third voltage, a second electrode which is electrically connected to the third node, and a gate electrode which receives an initialization signal.

In example embodiments, the pixel circuit may further include a third transistor including a first electrode which is electrically connected to the first node, a second electrode which is electrically connected to the fourth node, and a gate electrode which receives a first light emission control signal.

In example embodiments, the pixel circuit may further include a fourth transistor including a first electrode which is electrically connected to the first node, a second electrode which is electrically connected to the fourth node, and a gate electrode which receives the initialization signal.

Therefore, a pixel circuit according to example embodiments may remove an influence of a parasitic capacitor (or, a parasitic capacitance) of an light emission element for writing a data signal by including a first transistor to provide a third voltage to the light emission element in a light non-light emission period.

In addition, the pixel circuit may store the pixel may store a compensated data signal which is compensated by a threshold voltage of a driving transistor by including first and second capacitors which are electrically connected in serial between a gate electrode and a source electrode of the driving transistor and by receiving a data signal through a node to which the first and second capacitors are connected. Therefore, the pixel circuit may prevent a loss of the data signal Furthermore, a method of driving a pixel circuit according to example embodiments may drive the pixel circuit efficiently.

BRIEF DESCRIPTION OF THE DRAWINGS

Illustrative, non-limiting example embodiments will be more clearly understood from the following detailed description taken in conjunction with the accompanying drawings.

DESCRIPTION OF EMBODIMENTS

Hereinafter, the present inventive concept will be explained in detail with reference to the accompanying drawings.

Figure 1:
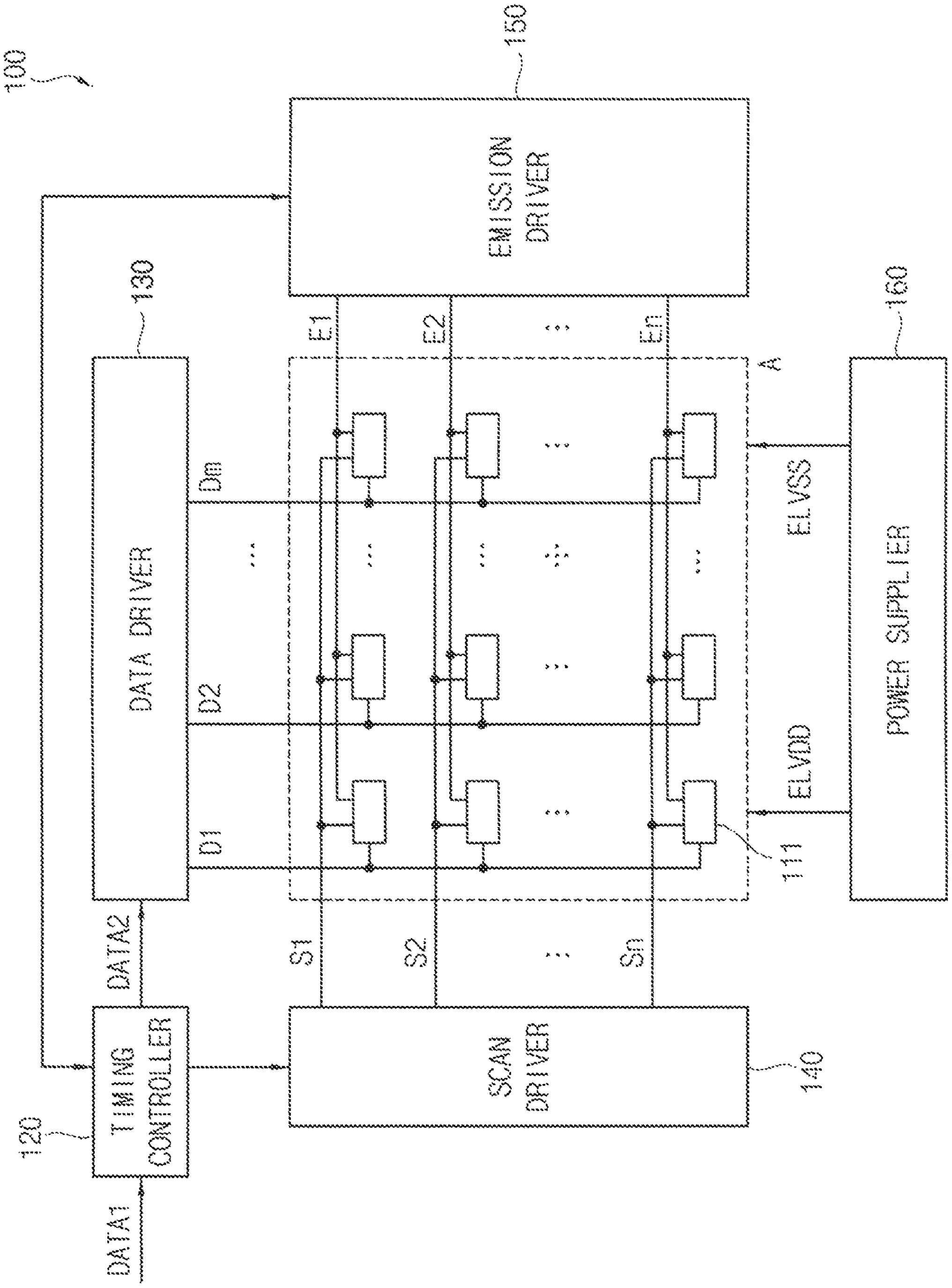
FIG. 1 is a block diagram illustrating a display device according to example embodiments.

FIG. 1 is a block diagram illustrating a display device according to example embodiments.

Referring to FIG. 1, the display device 100 may include a display panel 110, a timing controller 120, a data driver 130, a scan driver 140, an emission driver 150 (or, a light emission driver), and a power supplier 160 (or, a power supply). The display device 100 may display an image based on image data provided from an external component, for example, graphic card. For example, the display device 100 may be an organic light emitting display device.

The display panel 110 may include scan lines S1 through Sn, data lines D1 through Dm, light emission control lines E1 through En, and pixels 111 (or, pixel circuits), where each of n and m is an integer greater than or equal to 2. The pixels 111 may be disposed in cross-regions of the scan lines S1 through Sn, the data lines D1 through Dm, and the light emission control lines E1 through En, respectively.

Each of the pixels 111 may store a data signal in response to a scan signal, and may emit light based on a stored data signal. A configuration of the pixels 111 will be described in detail with reference to FIGS. 2A through 6B.

The timing controller 120 may control the data driver 130, the scan driver 140, and the emission driver 150. The timing controller 120 may generate a scan driving control signal, a data driving control signal, and a light emission driving control signal, and may control the data driver 130, the scan driver 140, and the emission driver 150 using generated signals.

The data driver 130 may generate the data signal based on image data (e.g., second data DATA2) provided from the timing controller 120. The data driver 130 may provide the display panel 110 with the data signal generated in response to the data driving control signal. That is, the data driver 130 may provide the data signal to the pixels 111 through the data lines D1 through Dm.

In some example embodiments, the data driver 130 may generate a first data voltage (e.g., a high data voltage) and a second data voltage (e.g., a low data voltage) when the display device 100 employs a digital driving technique. Here, the digital driving technique may be one of methods of driving the display device 100, provide the first data voltage and/or the second data voltage to the pixels 111 and may represent grayscales by changing a light emission time of the pixels 111.

The scan driver 140 may generate the scan signal based on the scan driving control signal. The scan driving control signal may include a start pulse and clock signals. The scan driver 140 may include shift registers sequentially generating the scan signal based on the start pulse and the clock signals.

The emission driver 150 may generate a light emission driving control signal and may provide the light emission control signal to the pixels 111 through the light emission control lines E1 through En. The pixels 111 may emit light in response to the light emission control signal having a logic high level or a logic low level depending on types of thin film transistors.

The power supplier 160 may generate a first power voltage ELVDD and a second power voltage ELVSS. Each of the first power voltage ELVDD and the second power voltage ELVSS may be used to drive the display panel 110 (or, the display device 100). The second power voltage ELVSS may have a voltage level lower than a voltage level of the first power voltage ELVDD.

Figure 2A:
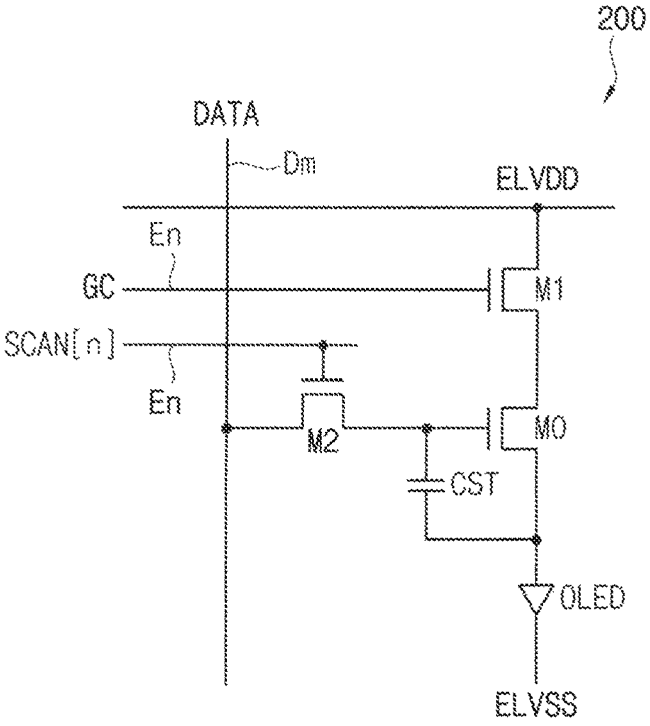
FIG. 2A is a circuit diagram illustrating a comparative example of a pixel included in the display device of FIG. 1.

FIG. 2A is a circuit diagram illustrating a comparative example of a pixel included in the display device of FIG. 1.

Referring to FIG. 2A, a pixel 200 may include a driving transistor M0, a first transistor M1, a switching transistor M2, a storage capacitor CST, and a light emission element OLED.

The driving transistor M0 may include a first electrode which is electrically connected to the light emission element OLED, a second electrode which is electrically connected to the first transistor M1, and a gate electrode which is electrically connected to a second electrode of the switching transistor M2. The first transistor M1 may include a first electrode which is electrically connected to the first power voltage ELVDD, a second electrode which is electrically connected to the second electrode of the driving transistor M0, and a gate electrode which receives a light emission control signal GC (or, which is electrically connected to a light emission control line En). The switching transistor M2 may include a first electrode which is electrically connected to a data line Dm, a second electrode which is electrically connected to the gate electrode of the driving transistor M0, and a gate electrode which receives a scan signal SCAN[n] (or, which is electrically connected to a scan line Sn). The storage capacitor CST may be electrically connected between the gate electrode of the driving transistor M0 and the first electrode of the driving transistor M0.

The switching transistor M2 may be turned on in response to the scan signal SCAN[n] and may transfer a data signal DATA to the gate electrode of the driving transistor M0. The storage capacitor CST may store the data signal DATA temporally. The first transistor M1 may form a current path (or, a current flowing path) between the first power voltage ELVDD and the driving transistor M0 in response to the light emission control signal GC. In this case, the driving transistor M0 may transfer a driving current to the light emission element OLED in response to the data signal DATA (i.e., the data signal DATA which is stored in the storage capacitor CST). The light emission element OLED may emit light based on the driving current. Here, the light emission element OLED may be an organic light emitting diode.

Figure 2B:
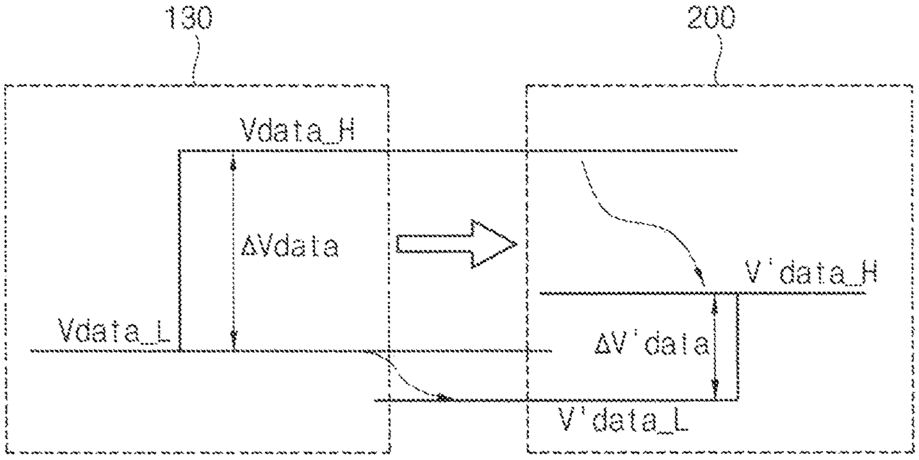
FIG. 2B is a diagram illustrating a data voltage measured at the pixel of FIG. 2A.

FIG. 2B is a diagram illustrating a data voltage measured at the pixel of FIG. 2A.

Referring to FIG. 2B, measured levels V'data_H and V'data_L of a data voltage, which are measured at the pixel 200, may be different from supplying levels Vdata_H and Vdata_L of a data voltage which are provided from the data driver 130. As illustrated in FIG. 2B, a first measured level V'data_H of the data voltage measured at the pixel 200 may be lower than a first supplying level Vdata_H of the data voltage supplying from the data driver 130. Similarly, a second measured level V'data_L of the data voltage measured at the pixel 200 may be lower than a second supplying level Vdata_L of the data voltage supplying from the data driver 130. Therefore, a voltage difference ΔV'data between the data voltages measured at the pixel 200 may be different from a voltage difference ΔVdata between the data voltages supplying from the data driver 130. As a result, the pixel 200 may emit light with a luminance different from a target luminance corresponding to a certain grayscale.

It is not illustrated in FIG. 2A, the light emission element OLED may include a parasitic capacitor $C_{OLED}$ (or, a parasitic capacitance), and so the data signal DATA provided to the gate electrode of the driving transistor M0 may be stored both in the storage capacitor Cst and the parasitic capacitor $C_{OLED}$ of the light emission element OLED. That is, a gate to source voltage Vgs of the driving transistor M0 may be different from the data signal DATA (or, the data voltage Vdata). For example, the gate to source voltage Vgs (V'data) of the driving transistor M0 may be represented as [Equation 1] below.

$$V'data = \frac{Coled}{Cst + Coled} \times Vdata \quad \text{[Equation 1]}$$

Here, V'data denotes the gate to source voltage of the driving transistor M0 (or, a measured level V'data of the data signal DATA measure at the pixel 200), Coled denotes parasitic capacitance of the light emission element OLED, Cst denotes capacitance of the storage capacitor CST, and Vdata denotes a supplying level Vdata of the data signal DATA provided to the pixel 200.

As described with reference to FIGS. 2A and 2B, the pixel 200 according to a comparative example may store the data signal DATA (or, the data voltages Vdata_H and Vdata_L) in the storage capacitor CST, but the stored data signal may be less than the data signal DATA provided from the data driver due to the parasitic capacitor $C_{OLED}$ of the light emission element OLED.

Figure 3A:
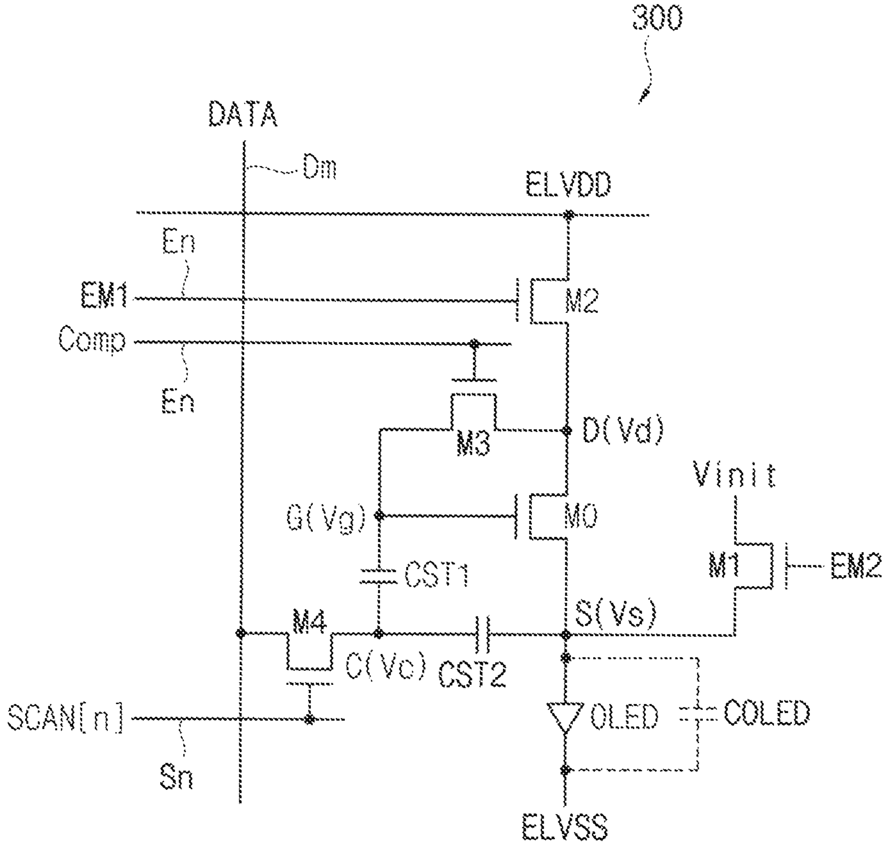
FIG. 3A is a circuit diagram illustrating an example of a pixel included in the display device of FIG. 1.

FIG. 3A is a circuit diagram illustrating an example of a pixel included in the display device of FIG. 1.

Referring to FIG. 3A, a pixel 300 may include a light emission element OLED, a driving transistor M0, a first transistor M1, a second transistor M2, a third transistor M3, a first storage capacitor CST1, a second storage capacitor CST2, and a switching transistor M4.

The light emission element OLED may be electrically connected between a first node S and the second power voltage ELVSS. The light emission elements OLED may emit light corresponding to a driving current flowing through the first node S. For example, the light emission element OLED may be an organic light emitting diode.

The driving transistor M0 may include a first electrode which is electrically connected to the first node S, a second electrode which is electrically connected to a second node D, and a gate electrode which is electrically connected to a third node G. Here, the second electrode may be a drain electrode, and the first electrode may be a source electrode. The driving transistor M0 may transfer the driving current to the light emission element OLED based on a third node voltage Vg at the third node G.

The first transistor M1 may include a first electrode which receives a third voltage Vinit, a second electrode which is electrically connected to the first node S, and a gate electrode which receives a second light emission control signal EM2. Here, the third voltage Vinit may be an initialization voltage to control a parasitic capacitor $C_{OLED}$ (or, parasitic capacitance) of the light emission element OLED and may be generated by the data driver 130 or by the power supplier 160. The second light emission control signal EM2 may be generated by the emission driver 150. The first transistor M1 may provide the third voltage Vinit to the first node S in response to the second light emission control signal EM2. Therefore, the first node S may be initialized and maintained to have the third voltage Vinit, and the parasitic capacitor $C_{OLED}$ of the light emission elements OLED may be charged and maintained with the third voltage Vinit. In an example embodiment, the third voltage Vinit may have a voltage level equal to or lower than a threshold voltage of the light emission element OLED. For example, the third voltage Vinit may be 0 volt [V]. Therefore, the light emission element OLED may emit no light when the third voltage Vinit is provided to the first node S.

The second transistor M2 may include a first electrode which is electrically connected to a first line, a second electrode which is electrically connected to the second node D, and a gate electrode which receives a first light emission control signal EM1. Here, the first line may supply the first power voltage ELVDD. The second transistor M2 may connect the first line to the second node D in response to the first light emission control signal EM1 (i.e., the second transistor M2 may form a flowing path of the driving current).

The third transistor M3 may include a first electrode which is electrically connected to the second node D, a second electrode which is electrically connected to the third node G, and a gate electrode which receives a compensation control signal Comp. The third transistor M3 may electrically connect the second node D and the third node G in response to the compensation control signal Comp.

The first storage capacitor CST1 may be electrically connected between the third node G and a fourth node C, and the second storage capacitor CST2 may be electrically connected between the fourth node C and the first node S. The first and second capacitors CST1 and CST2 may store the data signal DATA provide through the fourth node C.

The switching transistor M4 may include a first electrode which is electrically connected to the data line Dm, a second electrode which is electrically connected to the fourth node C, and a gate electrode which receives a scan signal SCAN [n]. The gate electrode of the switching transistor M4 may be electrically connected to a scan line Sn. The switching transistor M4 may transfer the data signal DATA to the fourth node C in response to the scan signal SCAN[n].

In some example embodiments, each of the driving transistor M0, the first transistor M1, the second transistor M2, the third transistor M3, and the switching transistor M4 may be N-type transistor.

Figure 3B:
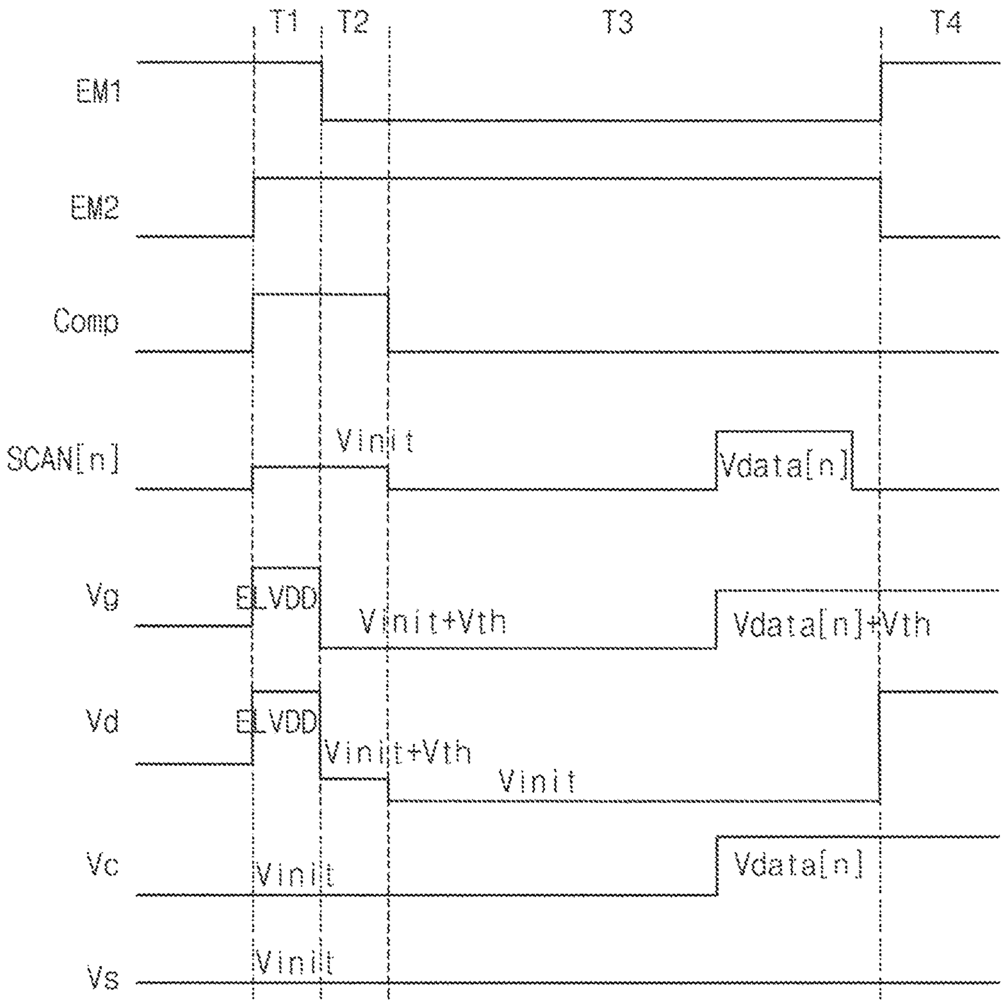
FIG. 3B is a waveform diagram illustrating an operation of the pixel of FIG. 3A.

FIG. 3B is a waveform diagram illustrating an operation of the pixel of FIG. 3A.

Referring to FIGS. 3A and 3B, the pixel 300 may emit light during a light emission period. The operation period may include a first period T1, a second period T2, a third period T3, and a fourth period T4.

Here, the first period T1 may be a period to initialize the third node G (or, the gate electrode of the driving transistor M0). That is, in the first period T1, the pixel 300 may perform an initialization operation to initialize the data signal DATA, which is written in a previous frame. The second period T2 may be a period to compensate a threshold voltage Vth of the driving transistor M0. That is, in the second period T2, the pixel 300 may perform a compensation operation to compensate the threshold voltage Vth of the driving transistor M0. The third period T3 may be a period to write the data voltage DATA to the pixel 300. That is, in the third period T3, the pixel 300 may perform a writing operation to store the data signal DATA provide from an external component using the first and second storage capacitors CST1 and CST2. The fourth period T4 may be a period for the pixel 300 to emit a light. That is, in the fourth period T4, the pixel 300 may perform an emission operation to emit a light based on a stored data signal DATA.

In the first period T1, the first light emission control signal EM1, the second light emission control signal EM2, the compensation control signal Comp, and the scan signal SCAN[n] may have a logic high level, respectively. In the first period, the data signal DATA may be equal to the third voltage Vinit. Here, the logic high level may be a turn-on voltage level to turn a transistor on, and a logic low level may a turn-off voltage level to turn the transistor off.

The second transistor M2 may be turned on in response to the first light emission control signal EM1 having the logic high level, and a second node voltage Vd at the second node D may be equal to the first power voltage ELVDD.

The first transistor M1 may be turned on in response to the second light emission control signal EM2 having the logic high level, and a first node voltage Vs at the first node S may be equal to the third voltage Vinit. In this case, the parasitic capacitor $C_{OLED}$ of the light emission element OLED may be charged with the third voltage Vinit.

The third transistor M3 may be turned on in response to the compensation control signal having the logic high level, and a third node voltage Vg at the third node G may be equal to the second node voltage Vd at the second node D. That is, the third node voltage Vg at the third node G may be equal to the first power voltage ELVDD.

The switching transistor M4 may be turned on in response to the scan signal SCAN[n] having the logic high level, and a fourth node voltage Vc at the fourth node C may be equal to the third voltage Vinit.

Therefore, the pixel 300 may initialize the data signal DATA, which is stored in the first and second storage capacitors CST1 and CST2 (or, the data signal DATA stored in the pixel 300 in a previous frame or in a previous light emission period) in the first period T1.

In the second period T2, the first light emission control signal EM1 may be changed to have the logic low level, and the second light emission control signal EM2, the compensation control signal Comp, and the scan signal SCAN[n] may have the logic high level, respectively. The data signal DATA may be equal to the third voltage Vinit.

Because the first transistor M1 and the switching transistor M4 are respectively maintained in a turn-on state, the first node voltage Vs at the first node S and the fourth node voltage Vc at the fourth node C may be respectively maintained (with the first node voltage Vs at the first node S in the first period T1 and the fourth node voltage Vc at the fourth node C in the first period T1 (e.g., the third voltage Vinit)).

The second transistor M2 may be turned off in response to the first light emission control signal EM1 having the logic low level, and the third node voltage Vg at the third node G may be represented as a sum of the third voltage Vinit and the threshold voltage Vth of the driving transistor M0 according to the threshold voltage Vth of the driving transistor M0 (i.e., Vg=Vinit+Vth). In this case, the first storage capacitor CST1 may be charged with a voltage difference between the third node voltage Vg at the third node G and the fourth node voltage Vc at the fourth node G. That is, the threshold voltage Vth of the driving transistor M0 may be charged in the first storage capacitor CST1 (i.e., Vg−Vc=(Vinit+Vth)−Vinit)=Vth).

The third transistor M3 may be maintained in a turn-on state, and the second node voltage Vd at the second node D may be equal to the third node voltage Vg at the third node G. That is, the second node voltage Vd at the second node D may be represented as a sum of the third voltage Vinit and the threshold voltage Vth of the driving transistor M0 (i.e., Vd=Vinit+Vth).

Therefore, the pixel 300 may store the threshold voltage Vth of the driving transistor M0 in the first storage capacitor CST1 in the second period T2. The threshold voltage Vth of the driving transistor M0 stored in the first storage capacitor CST1 may be used in a subsequent period.

In the third period T3, the first light emission control signal EM1 may have the logic low level, the second light emission control signal EM2 may have the logic high level, the compensation control signal Comp may be changed to have the logic low level, and the scan signal SCAN[n] may have the logic high level in a certain period. The data signal DATA may have a data voltage Vdata[n].

Because the first transistor M1 is maintained in a turn-on state, the first node voltage Vs at the first node S may be maintained with the third voltage Vinit.

The third transistor M3 may be turned off in response to the compensation control signal Comp having the logic low level, and the second node voltage Vd at the second node D may be equal to the first node voltage Vs at the first node S. That is, the second node voltage Vd at the second node D may be changed to be equal to the third voltage Vinit.

The switching transistor M4 may be turned on in response to the scan signal SCAN[n] having the logic high level at the certain period, and the fourth node voltage Vc at the fourth node C may be changed to have the data voltage Vdata[n].

The third node voltage Vg at the third node G may be represented with the fourth node voltage Vc at the fourth node C and a voltage which is charged in the first storage capacitor CST1. Because the first storage capacitor CST1 is charged with the threshold voltage Vth of the driving transistor M0 in the second period T2, the third node voltage Vg at the third node G may be represented as a sum of the data voltage Vdata[n] and the threshold voltage Vth of the driving transistor M0 (i.e., Vg=Vdata[n]+Vth) according to capacitor coupling of the storage capacitor CST1. The second storage capacitor CST2 may be charged with a voltage difference between the data voltage Vdata[n] and the third voltage Vinit (i.e., Vdata[n]−Vinit).

Therefore, the pixel 300 may store the data voltage Vdata[n] using the first and second storage capacitors CST1 and CST2 in the third period T3. For example, when the third voltage Vinit is 0 V, the pixel 300 may store a data voltage which is compensated by the threshold voltage of the driving transistor M0 using the first and second capacitors CST1 and CST2.

In the fourth period T4, the first light emission control signal EM1 may be changed to have the logic high level, the second light emission control signal EM2, the compensation control signal Comp and the scan signal SCAN[n] may have the logic low level.

The second transistor M2 may be turned on in response to the first light emission control signal having the logic high level, and the driving transistor M0 may transfer the driving current to the light emission element OLED based on the third node voltage Vg at the third node G.

Because the third node voltage Vg at the third node G is equal to a sum of the data voltage Vdata[n] and the threshold voltage Vth of the driving transistor M0 (i.e., Vg=Vdata[n]+Vth), the driving current may be represented as [Equation 2] below.

$$I_{oled} = \frac{1}{2}\mu_n C_{ox}\frac{W}{L}(V_{data}[n] + V_{th} - V_{init} - V_{th})^2 = \frac{1}{2}\mu_n C_{ox}\frac{W}{L}(V_{data}[n])^2, \text{ where } V_{init} = 0 \quad \text{[Equation 2]}$$

Here, the Ioled denoted the driving current, each of μn, Cox, W and L denotes a constant, Vdata[n] denotes a data voltage, Vth denotes a threshold voltage Vth of the driving transistor M0, and Vinit denotes the third voltage Vinit.

Therefore, the driving current Ioled may be proportional to square of the data voltage Vdata[n].

As described above, the pixel 300 may remove an influence of the parasitic capacitor COLED of the light emission element OLED for writing of the data voltage Vdata and may store the data voltage Vdata[n] compensated by the threshold voltage Vth of the driving transistor M0 using the first and second storage capacitors CST1 and CST2. Therefore, the pixel 300 may emit light with a luminance corresponding to the data voltage Vdata[n] without a loss of the data voltage Vdata[n].

Figure 3C:
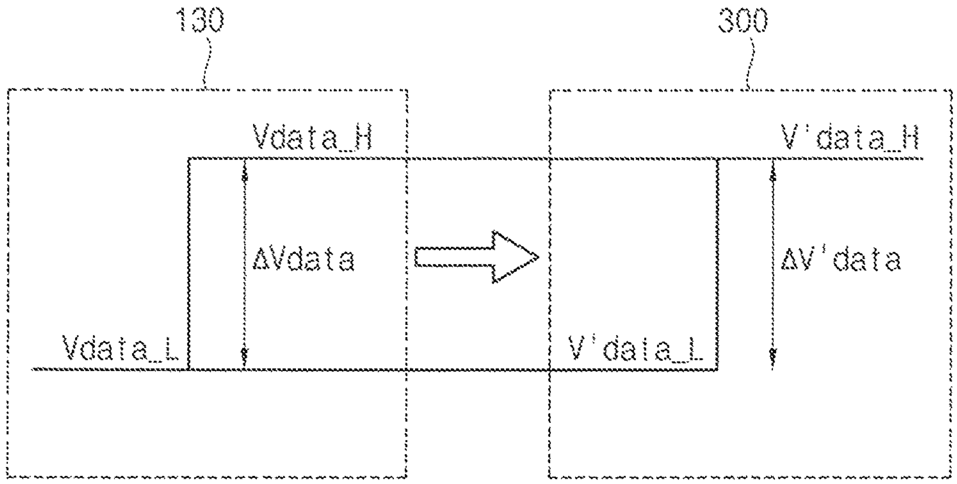
FIG. 3C is a diagram illustrating a data voltage measured at the pixel of FIG. 3A.

FIG. 3C is a diagram illustrating a data voltage measured at the pixel of FIG. 3A.

Referring to FIG. 3C, measured levels V'data_H and V'data_L of the data signal DATA measured at the pixel may be equal to the supplying levels Vdata_H and Vdata_L of the data signal DATA provided from the data driver 130. As illustrated in FIG. 3C, a first measured level V'data_H of the data voltage measured at the pixel 300 may be equal to a first supplying level Vdata_H of the data voltage provided from the data driver 130. Similarly, a second measured level V'data_L of the data voltage measured at the pixel 300 may be equal to a second supplying level Vdata_L of the data voltage provided from the data driver 130. Therefore, the pixel 300 may emit a light with a target luminance corresponding to a certain grayscale.

Figure 4A:
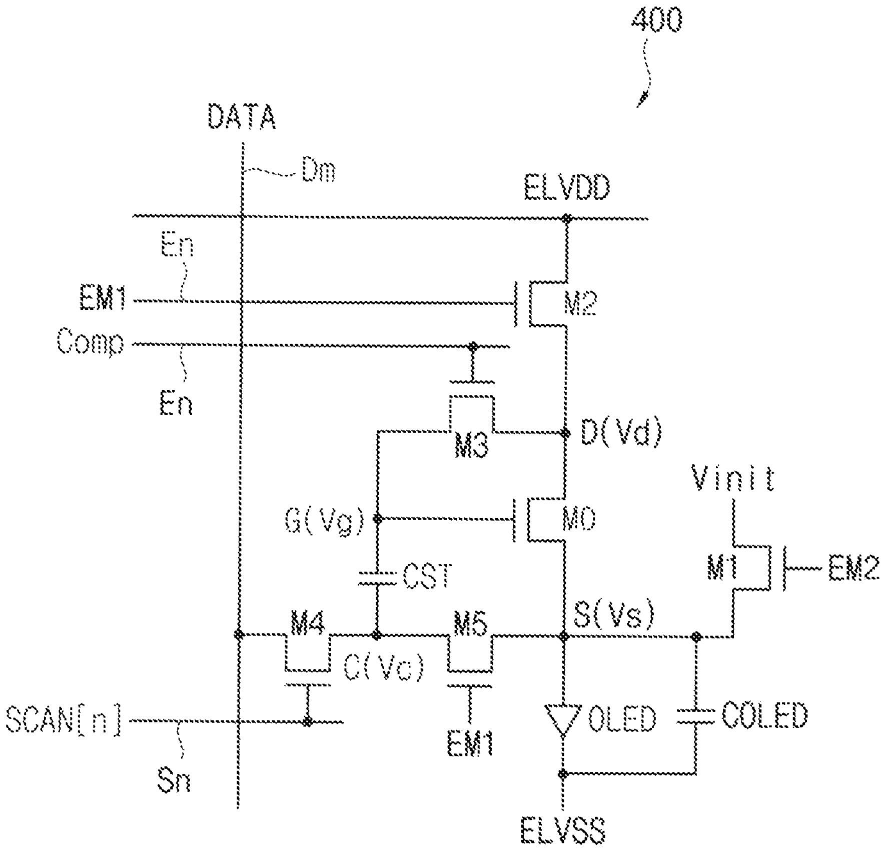
FIG. 4A is a circuit diagram illustrating an example of a pixel included in the display device of FIG. 1.

FIG. 4A is a circuit diagram illustrating an example of a pixel included in the display device of FIG. 1.

Referring to FIG. 4A, a pixel 400 may include a light emission element OLED, a driving transistor M0, a first transistor M1, a second transistor M2, a third transistor M3, a storage capacitor CST, a fifth transistor M5, and a switching transistor M4.

The light emission element OLED, the driving transistor M0, the first transistor M1, the second transistor M2, the third transistor M3, the storage capacitor CST, and the switching transistor M4 may be substantially the same as or similar to the light emission element OLED, the driving transistor M0, the first transistor M1, the second transistor M2, the third transistor M3, the first storage capacitor CST1, and the switching transistor M4 which are described with reference to FIG. 3A. Therefore, duplicated descriptions will not be repeated.

The fifth transistor M5 may include a first electrode which is electrically connected to the first node S, a second electrode which is electrically connected to the fourth node C, and a gate electrode which receives the first light emission control signal EM1. The fifth transistor M5 may electrically connect the first node S and the fourth node C in response to the first light emission control signal. The fifth transistor M5 may be an N-type transistor.

Figure 4B:
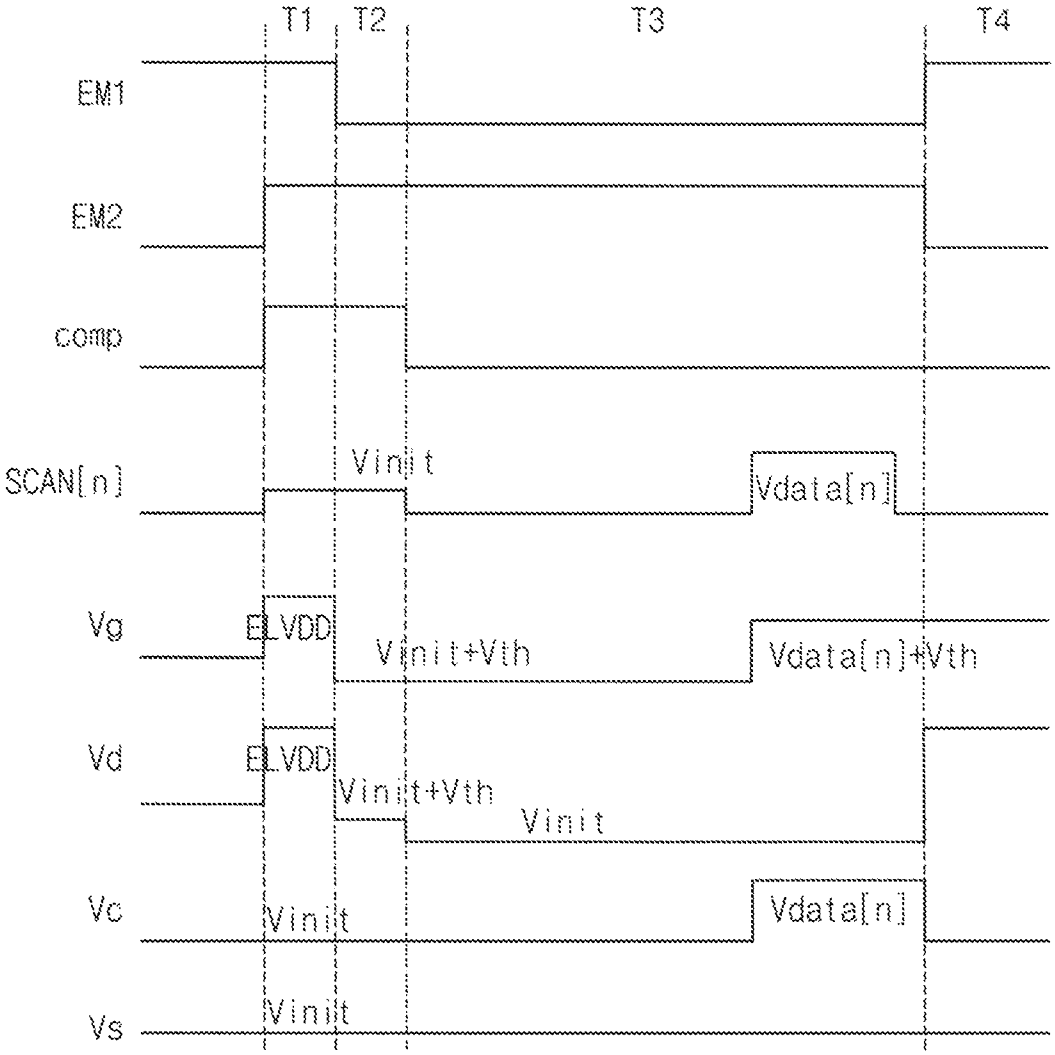
FIG. 4B is a waveform diagram illustrating an operation of the pixel of FIG. 4A.

FIG. 4B is a waveform diagram illustrating an operation of the pixel of FIG. 4A.

Referring to FIGS. 4A and 4B, the pixel 400 may emit a light during a light emission period. As described with reference to FIG. 3B, the operation period may include a first period T1, a second period T2, a third period T3, and a fourth period T4.

In the first period T1, the first light emission control signal EM1, the second light emission control signal EM2, the compensation control signal Comp, and the scan signal SCAN[n] may have the logic high level, respectively.

The second transistor M2 may be turned on in response to the first light emission control signal EM1 having the logic high level, and a second node voltage Vd at the second node D may be equal to the first power voltage ELVDD. The first transistor M1 may be turned on in response to the second light emission control signal EM2 having the logic high level, and a first node voltage Vs at the first node S may be equal to the third voltage Vinit. The third transistor M3 may be turned on in response to the compensation control signal having the logic high level, and a third node voltage Vg at the third node G may be equal to the second node voltage Vd at the second node D. That is, the third node voltage Vg at the third node G may be equal to the first power voltage ELVDD.

The switching transistor M4 may be turned on in response to the scan signal SCAN[n] having the logic high level, and the fifth transistor M5 may be turned on in response to the first light emission control signal EM1 having the logic high level. In this case, a fourth node voltage Vc at the fourth node C may be equal to the third voltage Vinit.

Therefore, the pixel 400 may initialize the data signal DATA, which is stored in the storage capacitors CST (or, the data signal DATA stored in the pixel 400 in a previous frame or in a previous light emission period) in the first period T1.

It is illustrated that the fifth transistor M5 receives the first light emission control signal EM1 having the logic high level in the first period T1. However, the fifth transistor M5 is not limited thereto. For example, the fifth transistor M5 may receive a certain control signal having the logic low level. In this case, the fifth transistor M5 is tuned off and the data signal DATA may be equal to the third voltage Vinit, but the fourth node voltage Vc at the fourth node C is equal to the third voltage Vinit according to turn-on operation of the switching transistor M4. That is, the pixel 400 may perform the initialization operation.

In the second period T2, the first light emission control signal EM1 may be changed to have the logic low level, and the second light emission control signal EM2, the compensation control signal Comp, and the scan signal SCAN[n] may have the logic high level, respectively. The data signal DATA may be equal to the third voltage Vinit.

Because the first transistor M1 and the switching transistor M4 are respectively maintained in a turn-on state, the first node voltage Vs at the first node S and the fourth node voltage Vc at the fourth node C may be respectively maintained (with the first node voltage Vs at the first node S in the first period T1 and the fourth node voltage Vc at the fourth node C in the first period T1 (e.g., the third voltage Vinit)).

The fifth transistor M5 may be turned off in response to the first light emission control signal EM1 having the logic low level, but the fourth node voltage Vc at the fourth node C may be maintained with the third voltage Vinit according to the turn-on state of the switching transistor M4.

The second transistor M2 may be turned off in response to the first light emission control signal EM1 having the logic low level, and the third node voltage Vg at the third node G may be represented as a sum of the third voltage Vinit and the threshold voltage Vth of the driving transistor M0 according to the threshold voltage Vth of the driving transistor M0 (i.e., Vg=Vinit+Vth). In this case, the storage capacitor CST may be charged with a voltage difference between the third node voltage Vg at the third node G and the fourth node voltage Vc at the fourth node G. That is, the threshold voltage Vth of the driving transistor M0 may be charged in the storage capacitor CST (i.e., Vg−Vc=(Vinit+Vth)−Vinit)=Vth).

The third transistor M3 may be maintained in a turn-on state, and the second node voltage Vd at the second node D may be equal to the third node voltage Vg at the third node G. That is, the second node voltage Vd at the second node D may be represented as a sum of the third voltage Vinit and the threshold voltage Vth of the driving transistor M0 (i.e., Vd=Vinit+Vth).

Therefore, the pixel 400 may store the threshold voltage Vth of the driving transistor M0 in the first storage capacitor CST1 in the second period T2. The threshold voltage Vth of the driving transistor M0 stored in the first storage capacitor CST1 may be used in a subsequent period.

In the third period T3, the first light emission control signal EM1 may have the logic low level, the second light emission control signal EM2 may have the logic high level, the compensation control signal Comp may be changed to have the logic low level, and the scan signal SCAN[n] may have the logic high level in a certain period. The data signal DATA may have a data voltage Vdata[n].

Because the first transistor M1 is maintained in a turn-on state, the first node voltage Vs at the first node S may be maintained with the third voltage Vinit.

The third transistor M3 may be turned off in response to the compensation control signal Comp having the logic low level, and the second node voltage Vd at the second node D may be equal to the first node voltage Vs at the first node S. That is, the second node voltage Vd at the second node D may be changed to be equal to the third voltage Vinit.

The switching transistor M4 may be turned on in response to the scan signal SCAN[n] having the logic high level at the certain period, and the fourth node voltage Vc at the fourth node C may be changed to have the data voltage Vdata[n].

The third node voltage Vg at the third node G may be represented with the fourth node voltage Vc at the fourth node C and a voltage which is charged in the storage capacitor CST. Because the storage capacitor CST is charged with the threshold voltage Vth of the driving transistor M0 in the second period T2, the third node voltage Vg at the third node G may be represented as a sum of the data voltage Vdata[n] and the threshold voltage Vth of the driving transistor M0 according to capacitor coupling of the storage capacitor CST (i.e., Vg=Vdata[n]+Vth).

In the fourth period T4, the first light emission control signal EM1 may be changed to have the logic high level, the second light emission control signal EM2 may be changed to have the logic low level, and the compensation control signal Comp and the scan signal SCAN[n] may have the logic low level.

The second transistor M2 may be turned on in response to the first light emission control signal having the logic high level, and the driving transistor M0 may transfer the driving current to the light emission element OLED based on the third node voltage Vg at the third node G.

Because the third node voltage Vg at the third node G is equal to a sum of the data voltage Vdata[n] and the threshold voltage Vth of the driving transistor M0 (i.e., Vg=Vdata[n]+Vth), the driving current Ioled may be proportional to square of the data voltage Vdata[n] as described with reference to the [Equation 2].

As described above, the pixel 400 may remove an influence of the parasitic capacitor $C_{OLED}$ of the light emission element OLED for writing of the data voltage Vdata and may store the data voltage Vdata[n] compensated by the threshold voltage Vth of the driving transistor M0 using the storage capacitor CST. Therefore, the pixel 400 may emit light with a luminance corresponding to the data voltage Vdata[n] without a loss of the data voltage Vdata[n].

Figure 4C:
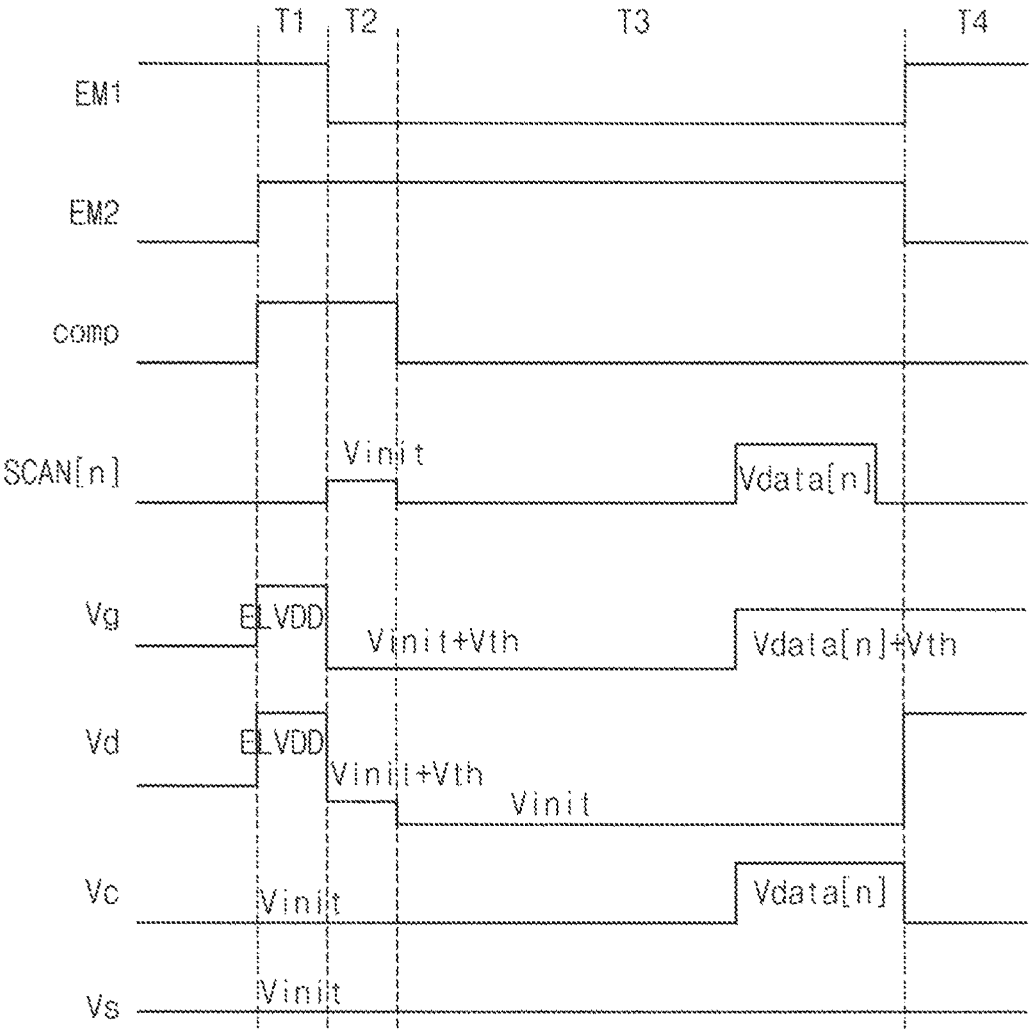
FIG. 4C is a waveform diagram illustrating an operation of the pixel of FIG. 4A.

FIG. 4C is a waveform diagram illustrating an operation of the pixel of FIG. 4A.

Referring to FIGS. 4A through 4C, a waveform of the first light emission control signal EM1, a waveform of the second light emission control signal EM2, and a waveform of the compensation control signal Comp may be substantially the same as a waveform of the first light emission control signal EM1, a waveform of the second light emission control signal EM2, and a waveform of the compensation control signal Comp described with reference to FIG. 4B, respectively. Therefore, duplicated descriptions will not be repeated.

In the first period T1, the scan signal SCAN[n] may have the logic low level. In this case, the switching transistor M4 may be turned off in response to the scan signal SCAN[n] having the logic low level. However, the fourth node voltage Vc at the fourth node C may be equal to the third voltage Vinit because the fifth transistor M5 is turned on the first light emission control signal EM1 having the logic high level. That is, the pixel 400 may perform an initialization operation in the first period T1.

As described with reference to FIG. 4B, the pixel 400 may perform a compensation operation of the threshold voltage Vth of the driving transistor M0, a writing operation (or, storage) of the data signal Vdata[n], and light emission operation, sequentially. Therefore, the pixel 400 may emit light with a luminance corresponding to the data voltage Vdata[n] without a loss of the data voltage Vdata[n].

Figure 5A:
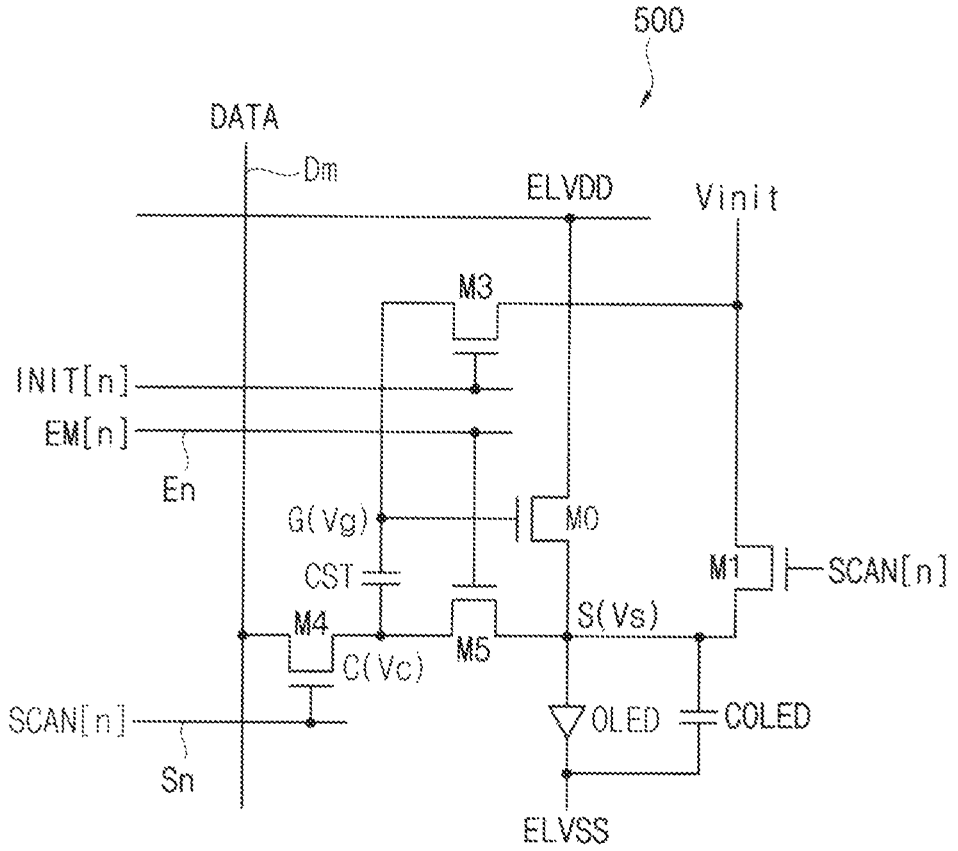
FIG. 5A is a circuit diagram illustrating an example of a pixel included in the display device of FIG. 1.

FIG. 5A is a circuit diagram illustrating an example of a pixel included in the display device of FIG. 1.

Referring to FIG. 5A, a pixel 500 may include a light emission element OLED, a driving transistor M0, a first transistor M1, a third transistor M3, a storage capacitor CST, a fifth transistor M5, and a switching transistor M4.

The light emission element OLED, the driving transistor M0, the storage capacitor CST, and the switching transistor M4 may be substantially the same as the light emission element OLED, the driving transistor M0, the storage capacitor CST, and the switching transistor M4 which are described with reference to FIG. 3A. Therefore, duplicated descriptions will not be repeated.

The driving transistor M0 may include a first electrode which is electrically connected to a first node S, a second electrode which is electrically connected to the first power voltage ELVDD, and a gate electrode which is electrically connected to a third node G. The driving transistor M0 may transfer a driving current to the light emission element OLED based on a third node voltage Vg at the third node G.

The third transistor M3 may include a first electrode which is electrically connected to the third node G, a second electrode which receives the third voltage Vinit (or, a reference voltage), and a gate electrode which receives an initialization signal (or, the compensation control signal Comp). The third transistor M3 may provide the third voltage Vinit to the third node G based on the initialization signal INIT[n].

The fifth transistor M5 may include a first node which is electrically connected to the first node S, a second electrode which is electrically connected to a fourth node C, and a gate electrode which receives a light emission control signal EM[n] (or, a first light emission control signal EM1). The fifth transistor M5 may electrically connect the first node S to the fourth node C in response to the light emission control signal EM[n].

Each of the driving transistor M0, the third transistor M3, and the fifth transistor M5 may be an N-type transistor.

Figure 5B:
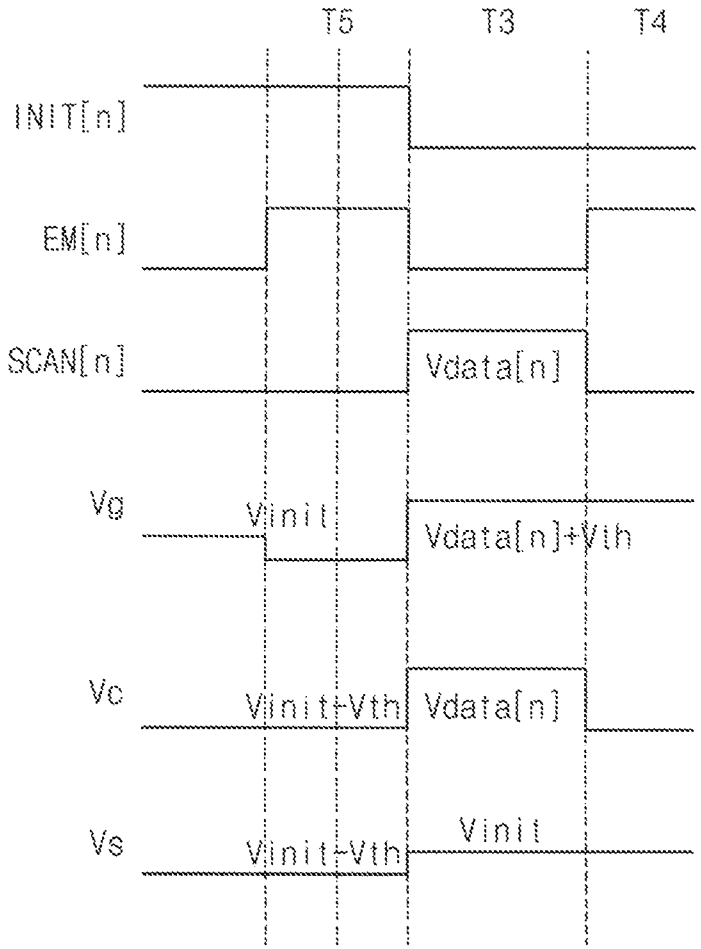
FIG. 5B is a waveform diagram illustrating an operation of the pixel of FIG. 5A.

FIG. 5B is a waveform diagram illustrating an operation of the pixel of FIG. 5A.

Referring to FIGS. 5A and 5B, the pixel 500 may emit a light during a light emission period. Here, the operation period may be a fifth period T5, a third period T3, and a fourth period T4. The fifth period T5 may include the first period T1 and the second period T2 which are described with reference to FIG. 3B. The third period T3 and the fourth period T4 may be substantially the same as the third period T3 and the fourth period T4 described with reference to FIG. 3A.

In the fifth period T5, the initialization signal INIT[n] and the light emission control signal EM[n] may have the logic high level, and the scan signal SCAN[n] may have the logic low level.

The third transistor M3 may be turned on in response to the initialization signal INIT[n] having the logic high level, and the third node voltage Vg at the third node G may be equal to the third voltage Vinit.

The driving transistor M0 may be turned off in response to the third node voltage Vg at the third node G, and the first node voltage Vs at the first node S may be lower than the third node voltage Vg at the third node G by the threshold voltage Vth of the driving transistor M0. That is, the first node voltage Vs at the first node S may be represented as a voltage difference between the third voltage Vinit and the threshold voltage Vth of the driving transistor M0 (i.e., Vs=Vinit−Vth).

The fifth transistor M5 may be turned on in response to the light emission control signal having the logic high level, and the fourth node voltage Vc at the fourth node C may be equal to the first node voltage Vs at the first node S. That is, the fourth node voltage Vc at the fourth node C may be the voltage difference between the third voltage Vinit and the threshold voltage Vth of the driving transistor M0 (i.e., Vc=Vinit−Vth).

In this case, the storage capacitor CST may be charged with the voltage difference between the third voltage Vinit and the fourth node voltage Vc at the fourth node C. That is, the threshold voltage Vth of the driving transistor M0 may be stored in the storage capacitor CST (i.e., Vg−Vc=Vinit−(Vinit−Vth)=Vth).

Therefore, the pixel 500 may initialize the data signal DATA, which is stored in the storage capacitors CST (or, the data signal DATA stored in the pixel 500 in a previous frame or in a previous light emission period) and may store the threshold voltage Vth of the driving transistor M0 in the fifth period T5.

In the third period T3, the initialization signal Vinit may be changed to have the logic low level, and the scan signal SCAN[n] may be changed to have the logic high level. The data signal DATA may have a data voltage Vdata[n].

The third transistor M3 may be turned off in response to the initialization signal INIT[n] having the logic low level, and the fifth transistor M5 may be turned off in response to the light emission control signal EM[n] having the logic low level.

The switching transistor M4 may be turned on in response to the scan signal SCAN[n] having the logic high level, and the fourth node voltage Vc at the fourth node C may be changed to have the data voltage Vdata[n].

The third node voltage Vg at the third node G may be represented as a sum of the data voltage Vdata[N] and the threshold voltage Vth of the driving transistor M0 according to capacitor coupling of the storage capacitor CST (i.e., Vg=Vdata[n]+Vth).

The first transistor M1 may be turned on in response to the scan signal SCAN[n] having the logic high level, and the first node voltage Vs at the first node S may be equal to the third voltage Vinit. In this case, the parasitic capacitor $C_{OLED}$ of the light emission element OLED may be charged with the third voltage Vinit.

In the fourth period T4, the initialization signal INIT[n] may have the logic low level, the light emission control signal EM[n] may be changed to have the logic high level, and the scan signal SCAN[n] may be changed to have the logic low level.

The third transistor M3 may be maintained in a turn-off state, and each of the first transistor M1 and the switching transistor M4 may be turned off in response to the scan signal SCAN[n] having the logic low level.

The driving transistor M0 may transfer the driving current to the light emission element based on the third node voltage Vg at the third node G.

Because the third node voltage Vg at the third node G is equal to a sum of the data voltage Vdata[n] and the threshold voltage Vth of the driving transistor M0 according to capacitor coupling of the storage capacitor CST (i.e., Vg=Vdata[n]+Vth), the driving current Ioled may be proportional to square of the data voltage Vdata[n] as described with reference to the [Equation 2].

Therefore, the pixel 500 may emit light with a luminance corresponding to the data voltage Vdata[n] in the third period T3.

As described above, the pixel 500 may remove an influence of the parasitic capacitor $C_{OLED}$ of the light emission element OLED for writing of the data voltage Vdata using the first transistor M1, and the pixel 500 may store the data voltage Vdata[n] compensated by the threshold voltage Vth of the driving transistor M0 using the storage capacitor CST. Therefore, the pixel 500 may emit a light with a luminance corresponding to the data voltage Vdata[n] without a loss of the data voltage Vdata[n].

Figure 6A:
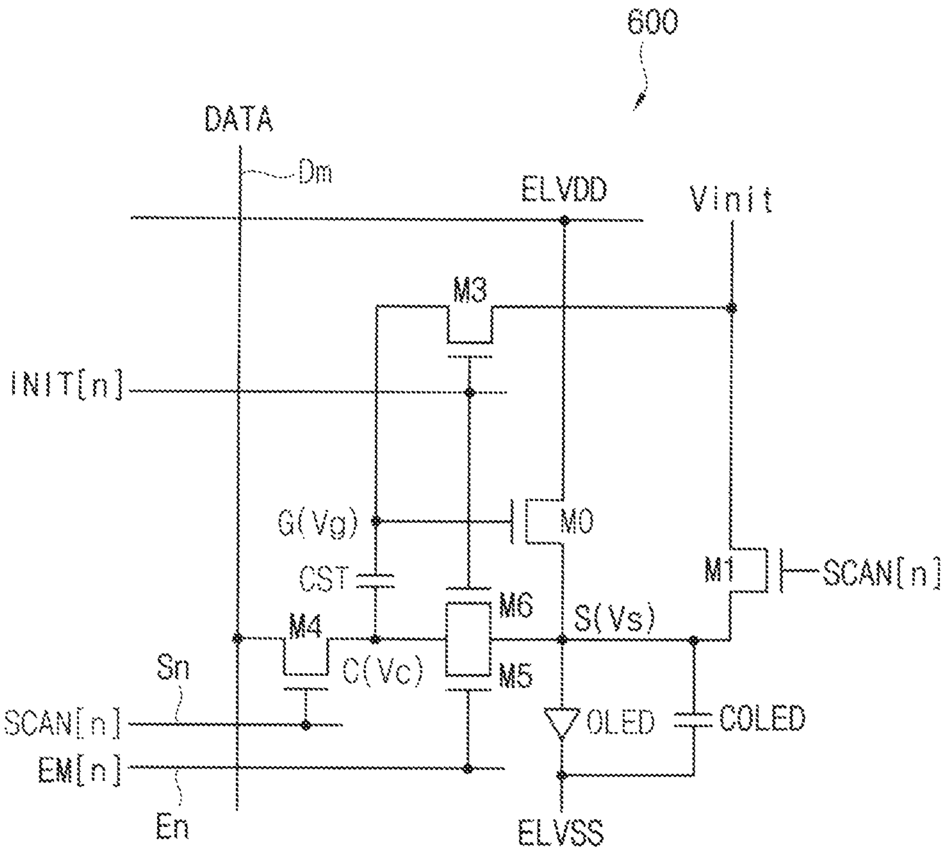
FIG. 6A is a circuit diagram illustrating an example of a pixel included in the display device of FIG. 1.

FIG. 6A is a circuit diagram illustrating an example of a pixel included in the display device of FIG. 1.

Referring to FIGS. 5A and 6A, a pixel 600 may be substantially the same as the pixel described with reference to FIG. 5A except a sixth transistor M6.

The sixth transistor M6 may include a first electrode which is electrically connected to a first node S, a second electrode which is electrically connected to a fourth node C, and a gate electrode which receives the initialization signal INIT[n]. The sixth transistor M6 may electrically connect the first node S and the fourth node C in response to the initialization signal INIT[n].

Figure 6B:
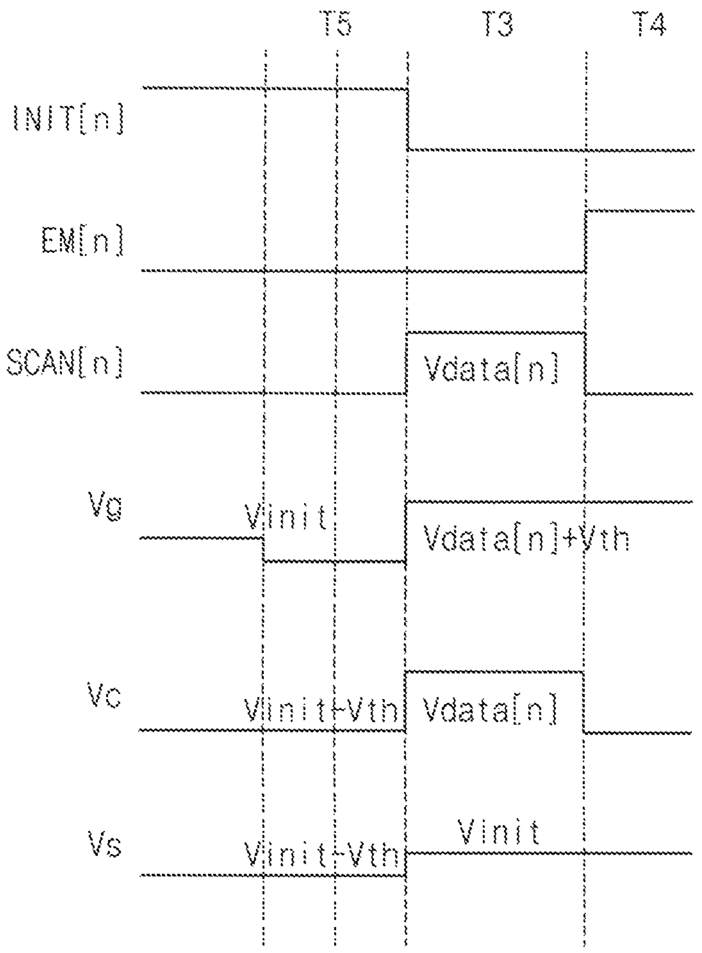
FIG. 6B is a waveform diagram illustrating an operation of the pixel of FIG. 5A.

FIG. 6B is a waveform diagram illustrating an operation of the pixel of FIG. 5A.

Referring to FIGS. 6A and 6B, the pixel 600 may emit a light during a light emission period. As described with reference to FIG. 5B, the operation period may be a fifth period T5, a third period T3, and a fourth period T4. The fifth period T5 may include the first period T1 and the second period T2 which are described with reference to FIG. 3B.

In the fifth period T5, the initialization signal INIT[n] may have the logic high level, the light emission control signal EM[n] may have the logic low level, and the scan signal SCAN[n] may have the logic low level.

The third transistor M3 may be turned on in response to the initialization signal INIT[n] having the logic high level, and the third node voltage Vg at the third node G may be equal to the third voltage Vinit.

The driving transistor M0 may be turned off in response to the third node voltage Vg at the third node G, and the first node voltage Vs at the first node S may be lower than the third node voltage Vg at the third node G by the threshold voltage Vth of the driving transistor M0. That is, the first node voltage Vs at the first node S may be represented as a voltage difference between the third voltage Vinit and the threshold voltage Vth of the driving transistor M0 (i.e., Vs=Vinit−Vth).

The fifth transistor M5 may be turned off in response to the light emission control signal having the logic low level. However, the sixth transistor M6 may be turned on in response to the initialization signal INIT[n] having the logic high level such that the fourth node voltage Vc at the fourth node C may be equal to the first node voltage Vs at the first node S. That is, the fourth node voltage Vc at the fourth node C may be the voltage difference between the third voltage Vinit and the threshold voltage Vth of the driving transistor M0 (i.e., Vc=Vinit−Vth).

In this case, the storage capacitor CST may be charged with the voltage difference between the third voltage Vinit and the fourth node voltage Vc at the fourth node C. That is, the threshold voltage Vth of the driving transistor M0 may be stored in the storage capacitor CST (i.e., Vg−Vc=Vinit−(Vinit−Vth)=Vth).

Therefore, the pixel 600 may initialize the data signal DATA, which is stored in the storage capacitors CST (or, the data signal DATA stored in the pixel 600 in a previous frame or in a previous light emission period) and may store the threshold voltage Vth of the driving transistor M0 in the fifth period T5.

In the third period T3, the initialization signal Vinit may be changed to have the logic low level, the light emission control signal EM[n] may have the logic low level, and the scan signal SCAN[n] may be changed to have the logic high level. The data signal DATA may have a data voltage Vdata[n].

The third transistor M3 and the sixth transistor M6 may be turned off in response to the initialization signal INIT[n] having the logic low level, and the fifth transistor M5 may be turned off in response to the light emission control signal EM[n] having the logic low level.

The switching transistor M4 may be turned on in response to the scan signal SCAN[n] having the logic high level, and the fourth node voltage Vc at the fourth node C may be changed to have the data voltage Vdata[n].

The third node voltage Vg at the third node G may be represented as a sum of the data voltage Vdata[N] and the threshold voltage Vth of the driving transistor M0 according to capacitor coupling of the storage capacitor CST (i.e., Vg=Vdata[n]+Vth).

The first transistor M1 may be turned on in response to the scan signal SCAN[n] having the logic high level, and the first node voltage Vs at the first node S may be equal to the third voltage Vinit. In this case, the parasitic capacitor COLED of the light emission element OLED may be charged with the third voltage Vinit.

In the fourth period T4, the initialization signal INIT[n] may have the logic low level, the light emission control signal EM[n] may be changed to have the logic high level, and the scan signal SCAN[n] may be changed to have the logic low level.

The third transistor M5 may be maintained in a turn-on state, and each of the first transistor M3 and the switching transistor M4 may be turned off in response to the scan signal SCAN[n] having the logic low level.

The driving transistor M0 may transfer the driving current to the light emission element based on the third node voltage Vg at the third node G.

Because the third node voltage Vg at the third node G is equal to a sum of the data voltage Vdata[n] and the threshold voltage Vth of the driving transistor M0 (i.e., Vg=Vdata[n]+Vth), the driving current Ioled may be proportional to square of the data voltage Vdata[n] as described with reference to the [Equation 2].

Therefore, the pixel 600 may emit light with a luminance corresponding to the data voltage Vdata[n] in the third period T3.

As described above, the pixel 600 may remove an influence of the parasitic capacitor $C_{OLED}$ of the light emission element OLED for writing of the data voltage Vdata using the first transistor M1, and the pixel 500 may store the data voltage Vdata[n] compensated by the threshold voltage Vth of the driving transistor M0 using the storage capacitor CST. Therefore, the pixel 600 may emit a light with a luminance corresponding to the data voltage Vdata[n] without a loss of the data voltage Vdata[n].

Figure 7:
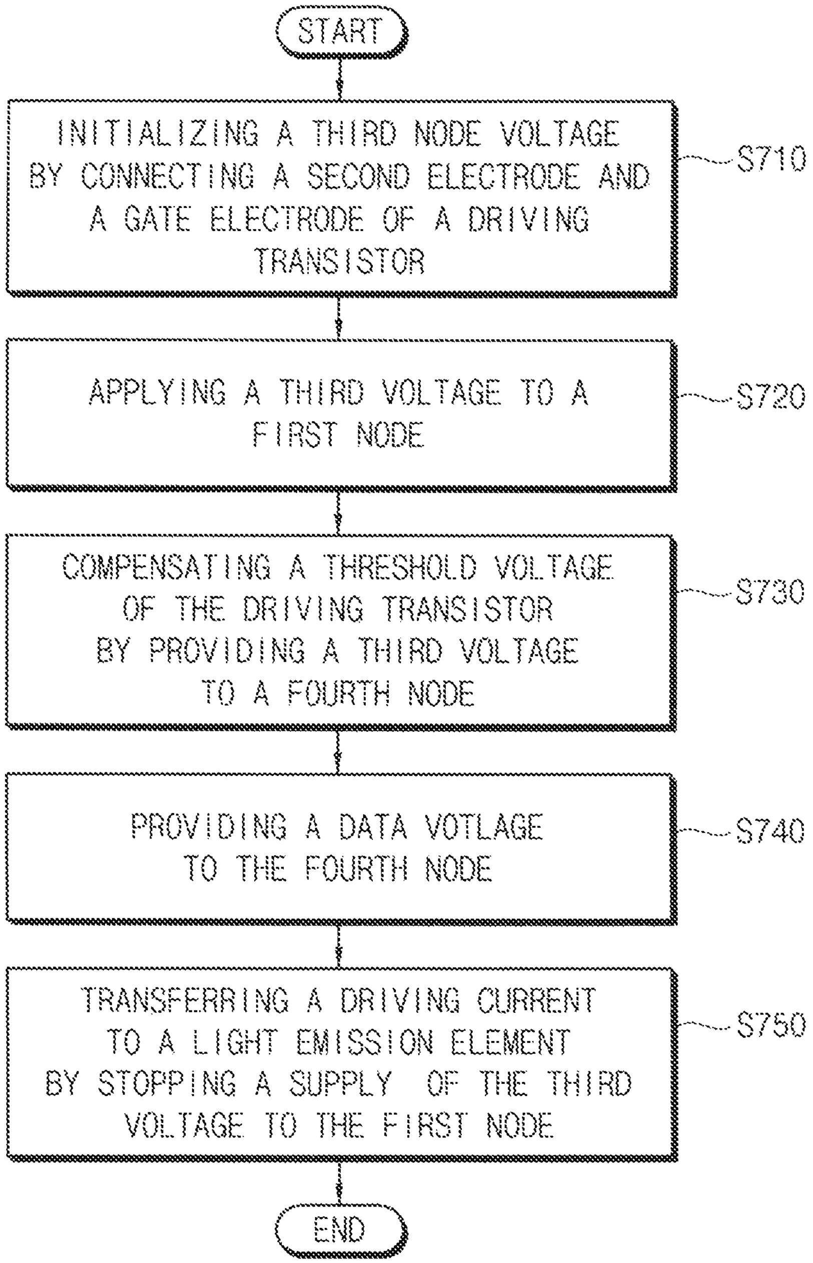
FIG. 7 is a flow diagram illustrating an example of a method of driving a pixel of FIG. 3A.

FIG. 7 is a flow diagram illustrating an example of a method of driving a pixel of FIG. 3A.

Referring to FIGS. 3A, 3B, and 7, the method of FIG. 7 may drive the pixel of FIG. 3A.

When the second electrode of the driving transistor M0 is electrically connected to the first line which transfers the first power voltage ELVDD, the method of FIG. 7 may initialize the third node voltage Vg at the third node G by electrically connecting the second electrode of the driving transistor M0 and the gate electrode of the driving transistor M0 (S710).

That is, the method of FIG. 7 may initialize the third node voltage Vg at the third node G during the first period T1 illustrated in FIG. 3B.

The method of FIG. 7 may maintain the first node voltage Vs at the first node S to be equal to the third voltage Vinit by providing the third voltage Vinit to the first node S (i.e., a node at which the light emission element OLED is electrically connected to the first electrode of the driving transistor M0) (S720).

The method of FIG. 7 may compensate the threshold voltage of the driving transistor M0 by providing the third voltage Vinit to the fourth node C (i.e., a node at which the first storage capacitor CST1 is electrically connected to the second storage capacitor CST2) and by disconnecting the first line from the second electrode of the driving transistor M0 (S730).

That is, the method of FIG. 7 may store the threshold voltage Vth of the driving transistor M0 in the first storage capacitor CST1 during the second period T2 illustrated in FIG. 3B.

The method of FIG. 7 may provide the data voltage Vdata[n] to the fourth node C (S740). That is, the method of FIG. 7 may store (or, write) the data voltage Vdata[n] in the second storage capacitor CST2 during the third period T3 illustrated in FIG. 3B.

The method of FIG. 7 may transfer the light emission element OLED with the driving current corresponding to the third node voltage Vg at the third node G by cutting off the third voltage Vinit to the first node S and by electrically connecting the first line to the second electrode of the driving transistor M0 (S750).

Figure 8:
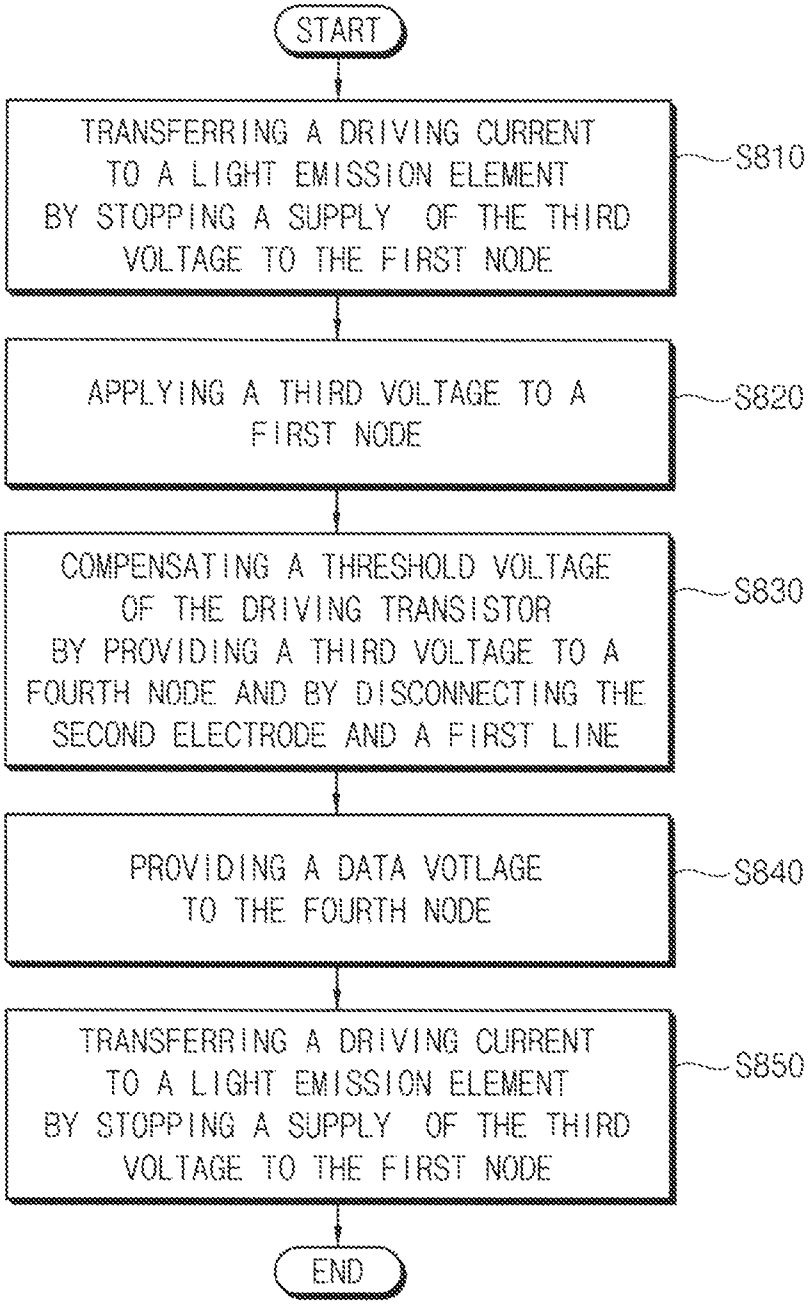
FIG. 8 is a flow diagram illustrating an example of a method of driving a pixel of FIG. 4A.

FIG. 8 is a flow diagram illustrating an example of a method of driving a pixel of FIG. 4A.

Referring to FIGS. 4A, 4B, and 8, the method of FIG. 8 may drive the pixel of FIG. 4A.

When the second electrode of the driving transistor M0 is electrically connected to the first line which transfers the first power voltage ELVDD, the method of FIG. 8 may initialize the third node voltage Vg at the third node G by electrically connecting the second electrode of the driving transistor M0 and the gate electrode of the driving transistor M0 (S810).

That is, the method of FIG. 8 may initialize the third node voltage Vg at the third node G during the first period T1 illustrated in FIG. 4B.

The method of FIG. 8 may maintain the first node voltage Vs at the first node S to be equal to the third voltage Vinit by providing the third voltage Vinit to the first node S (i.e., a node at which the light emission element OLED is electrically connected to the first electrode of the driving transistor M0) (8720).

The method of FIG. 8 may compensate the threshold voltage of the driving transistor M0 by disconnecting a terminal of the storage capacitor CST (or, the fourth node C) from the first electrode of the driving transistor M0, by providing the third voltage Vinit to the terminal or the storage capacitor CST, and by disconnecting the first line from the second electrode of the driving transistor M0 (S830).

That is, the method of FIG. 8 may store the threshold voltage Vth of the driving transistor M0 in the storage capacitor CST during the second period T2 illustrated in FIG. 4B.

The method of FIG. 8 may provide the data voltage Vdata[n] to the fourth node C (S840). That is, the method of FIG. 8 may store (or, write) the data voltage Vdata[n] in the storage capacitor CST during the third period T3 illustrated in FIG. 4B.

The method of FIG. 8 may transfer the light emission element OLED with the driving current corresponding to the third node voltage Vg at the third node G by cutting-off the third voltage Vinit to the first node S and by electrically connecting the first line to the second electrode of the driving transistor M0 (S850).

As described with reference to FIGS. 7 and 8, the method of driving a pixel circuit according to example embodiments may drive the pixel circuit efficiently.

The present inventive concept may be applied to any display device (e.g., an organic light emitting display device, a liquid crystal display device, etc.). For example, the present inventive concept may be applied to a television, a computer monitor, a laptop, a digital camera, a cellular phone, a smart phone, a personal digital assistant (PDA), a portable multimedia player (PMP), an MP3 player, a navigation system, a video phone, etc.

The foregoing is illustrative of example embodiments, and is not to be construed as limiting the inventive concept. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A pixel circuit comprising:
- a light emission element electrically connected between a first node and a second power voltage;
- a driving transistor including a first electrode which is electrically connected to the first node, a second electrode which is electrically connected to a second node, and a gate electrode which is electrically connected to a third node;
- a second transistor including a first electrode which is electrically connected to a first line transferring a first power voltage, a second electrode which is electrically connected to the second node, and a gate electrode which receives a first light emission control signal;
- a third transistor including a first electrode which is electrically connected to the second node, a second electrode which is electrically connected to the third node, and a gate electrode which receives a compensation control signal;
- a first storage capacitor electrically connected between the third node and a fourth node; and
- a switching transistor including a first electrode which is electrically connected to a data line, a second electrode which is electrically connected to the fourth node, and a gate electrode which receives a scan signal.

2. The pixel circuit of claim 1, wherein each of the driving transistor, the second transistor, the third transistor, and the switch transistor is an N-channel metal oxide semiconductor (NMOS) transistor, and
- wherein the first power voltage has a voltage level lower than a voltage level of the second power voltage.

3. The pixel circuit of claim 1, wherein the second transistor is turned on in a first period and in a fourth period and is turned off in a second period and in a third period in response to the first light emission control signal,
- wherein the first period is to initialize a third node voltage at the third node,
- wherein the second period is to compensate a threshold voltage of the driving transistor,
- wherein the third period is to receive a data signal,
- wherein the fourth period is for the light emission element to emit a light, and
- wherein the first through fourth periods are included in an operation period and are different from each other.

4. The pixel circuit of claim 3, further comprising:
- a first transistor including a first electrode which receives a third voltage, a second electrode which is electrically connected to the first node, and a gate electrode which receives a second light emission control signal,
- wherein the first transistor is turned on in the first period, in the second period, and in the third period and is turned off in the fourth period in response to the second light emission control signal.

5. The pixel circuit of claim 4, wherein the third transistor is turned on in the first period and in the second period and is turned off in the third period and in the fourth period in response to the compensation control signal.

6. The pixel circuit of claim 5, further comprising:
- a second storage capacitor electrically connected between the fourth node and the first node, wherein the switching transistor is turned on in the first period, in the second period and in the third period in response to the scan signal and charge the data signal to the first storage capacitor and the second storage capacitor.

7. The pixel circuit of claim 6, wherein the first storage capacitor stores the threshold voltage of the driving transistor in the second period.

8. The pixel circuit of claim 5, wherein the switching transistor is turned on in the third period in response to the scan signal and transfers the data voltage to fourth node.

9. The pixel circuit of claim 8, further comprising:

a second storage capacitor electrically connected between the fourth node and the first node, wherein the second storage capacitor stores the data voltage in the third period.

10. The pixel circuit of claim 1, further comprising:

a first transistor including a first electrode which receives a third voltage, a second electrode which is electrically connected to the first node, and a gate electrode which receives a second light emission control signal, wherein the third voltage is equal to or lower than a threshold voltage of the light emission element.

11. The pixel circuit of claim 1, further comprising:

a first transistor including a first electrode which receives a third voltage, a second electrode which is electrically connected to the first node, and a gate electrode which receives a second light emission control signal; and a second storage capacitor electrically connected between the fourth node and the first node.

12. A pixel circuit comprising:

a light emission element electrically connected between a first node and a second power voltage;

a driving transistor including a first electrode which is electrically connected to the first node, a second electrode which is electrically connected to a first line transferring a first power voltage, and a gate electrode which is electrically connected to a third node;

a third transistor including a first electrode which receives a reference voltage, a second electrode which is electrically connected to the third node, and a gate electrode which receives a compensation control signal;

a storage capacitor electrically connected between the third node and a fourth node; and a switching transistor including a first electrode which is electrically connected to a data line, a second electrode which is electrically connected to the fourth node, and a gate electrode which receives a scan signal.

13. The pixel circuit of claim 12, further comprising:

a second transistor including a first electrode which is electrically connected to the first line, a second electrode which is electrically connected to the second electrode of the driving transistor, and a gate electrode which receives a first light emission control signal; and a fifth transistor including a first electrode which is electrically connected to the first node, a second electrode which is electrically connected to the fourth node, and a gate electrode which receives the first light emission control signal, wherein the first electrode of the third transistor is electrically connected to the second node, and wherein the second node is electrically connected to the second electrode of the driving transistor and the second electrode of the second transistor.

14. The pixel circuit of claim 13, wherein the second transistor is turned on in a first period and in a fourth period and is turned off in a second period and in a third period in response to the first light emission control signal, wherein the first period is to initialize a third node voltage at the third node, wherein the second period is to compensate a threshold voltage of the driving transistor, wherein the third period is to receive a data signal, wherein the fourth period is for the light emission element to emit a light, and wherein the first through fourth periods are included in an operation period and are different from each other.

15. The pixel circuit of claim 14, further comprising:

a first transistor including a first electrode which receives a third voltage, a second electrode which is electrically connected to the first node, and a gate electrode which receives a second light emission control signal, wherein the first transistor is turned on in the first period, in the second period, and in the third period and is turned off in the fourth period in response to the second light emission control signal.

16. The pixel circuit of claim 15, wherein the third transistor is turned on in the first period and in the second period and is turned off in the third period and in the fourth period in response to the compensation control signal.

17. The pixel circuit of claim 16, wherein the switching transistor is turned on in the second period in response to the scan signal and charges the storage capacitor.

18. The pixel circuit of claim 17, wherein the storage capacitor stores the threshold voltage of the driving transistor in the second period.

19. The pixel circuit of claim 16, wherein the switching transistor is turned on in the third period in response to the scan signal and transfers the data voltage to fourth node.

20. The pixel circuit of claim 12, further comprising:

a first transistor including a first electrode which receives a third voltage, a second electrode which is electrically connected to the first node, and a gate electrode which receives a second light emission control signal; and a fifth transistor including a first electrode which is electrically connected to the first node, a second electrode which is electrically connected to the fourth node, and a gate electrode which receives a first light emission control signal.

* * * * *